United States Patent [19]

Kindgren et al.

[11] Patent Number: 4,523,749

[45] Date of Patent: Jun. 18, 1985

[54] HOLE FORMING MACHINE WITH ADJUSTABLE WORK CLAMPS

[75] Inventors: Lee Kindgren, Rockford; William B. Scott, Rochelle; Robert W. Voges, Rockford, all of Ill.

[73] Assignee: W. A. Whitney Corp., Rockford, Ill.

[21] Appl. No.: 471,446

[22] Filed: Mar. 2, 1983

[51] Int. Cl.³ .............................................. B23Q 3/08
[52] U.S. Cl. ...................................... 269/32; 269/58; 269/69; 269/73; 269/74; 269/82; 269/153; 269/157; 269/234; 414/753
[58] Field of Search ...................... 269/32, 58, 59, 60, 269/69, 73, 74, 82, 99–101, 152, 153, 157, 163, 234; 414/750, 753

[56] References Cited

U.S. PATENT DOCUMENTS 3,758,099 9/1973 Scott ...................................... 269/58
4,106,183 8/1978 Brolund et al. ..................... 29/564

Primary Examiner—Frederick R. Schmidt
Assistant Examiner—Judy J. Hartman
Attorney, Agent, or Firm—Leydig, Voit, Osann, Mayer & Holt, Ltd.

[57] ABSTRACT

The work clamps of a punch press are mounted in laterally spaced relation on a carriage which may be shifted to cause the clamps to re-position a workpiece relative to the punch. To enable automatic adjustment of the lateral position of the clamps on the carriage, each clamp is adapted to be selectively and automatically locked to or released from the carriage. When released from the carriage, each clamp is adapted to be automatically held in a stationary position so that the carriage may be shifted relative to the clamp to permit re-positioning of the clamp along the carriage.

8 Claims, 11 Drawing Figures

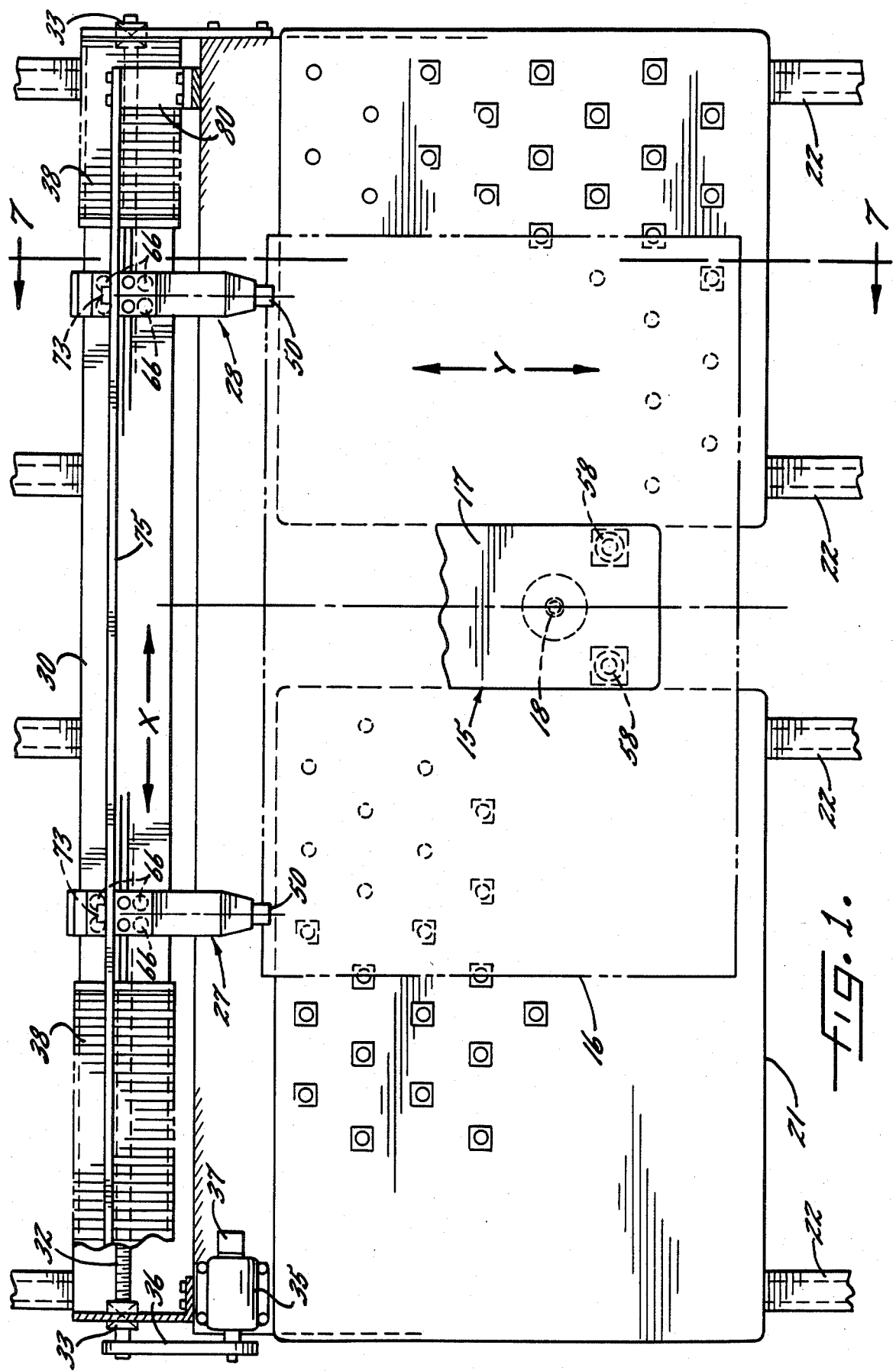

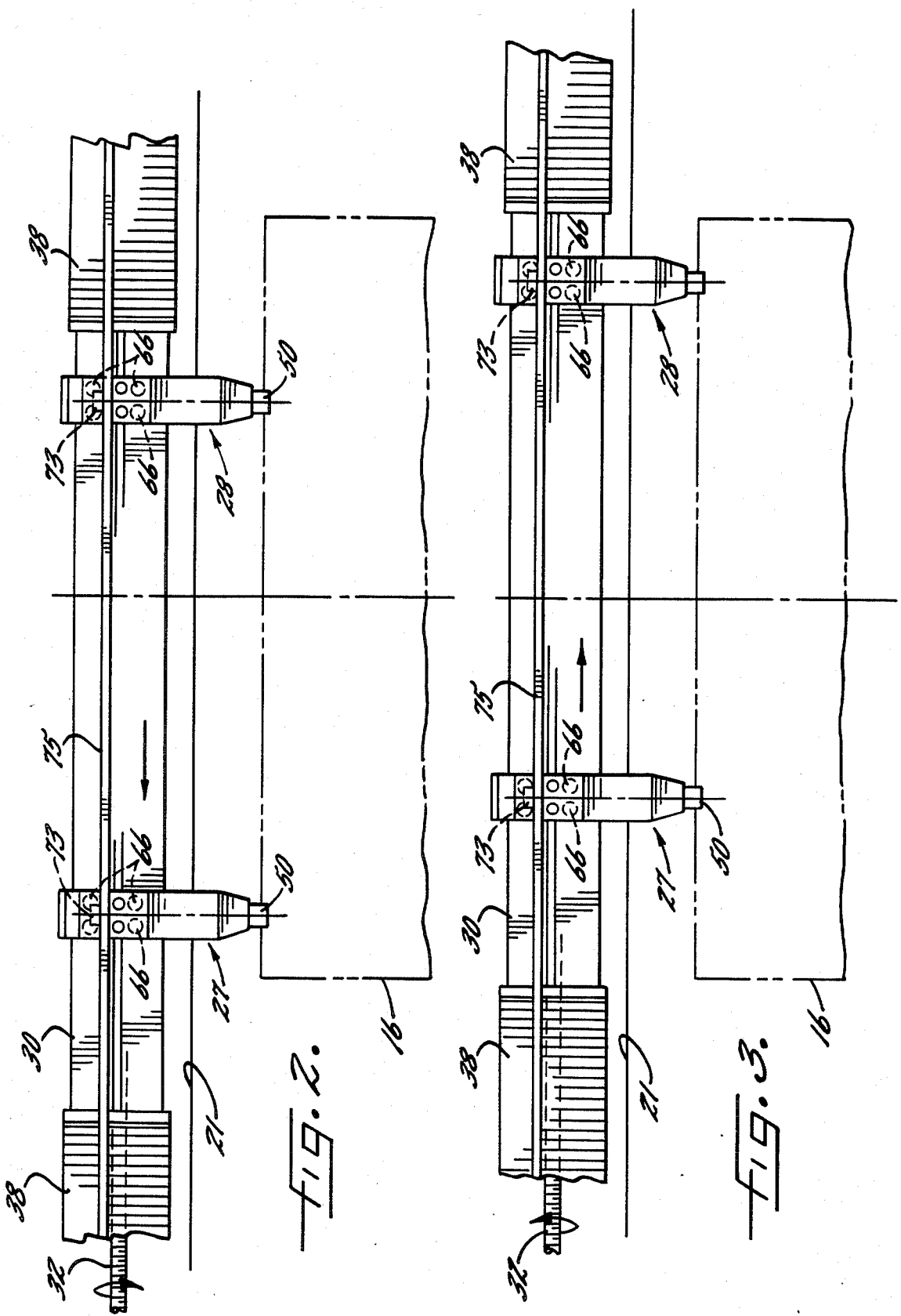

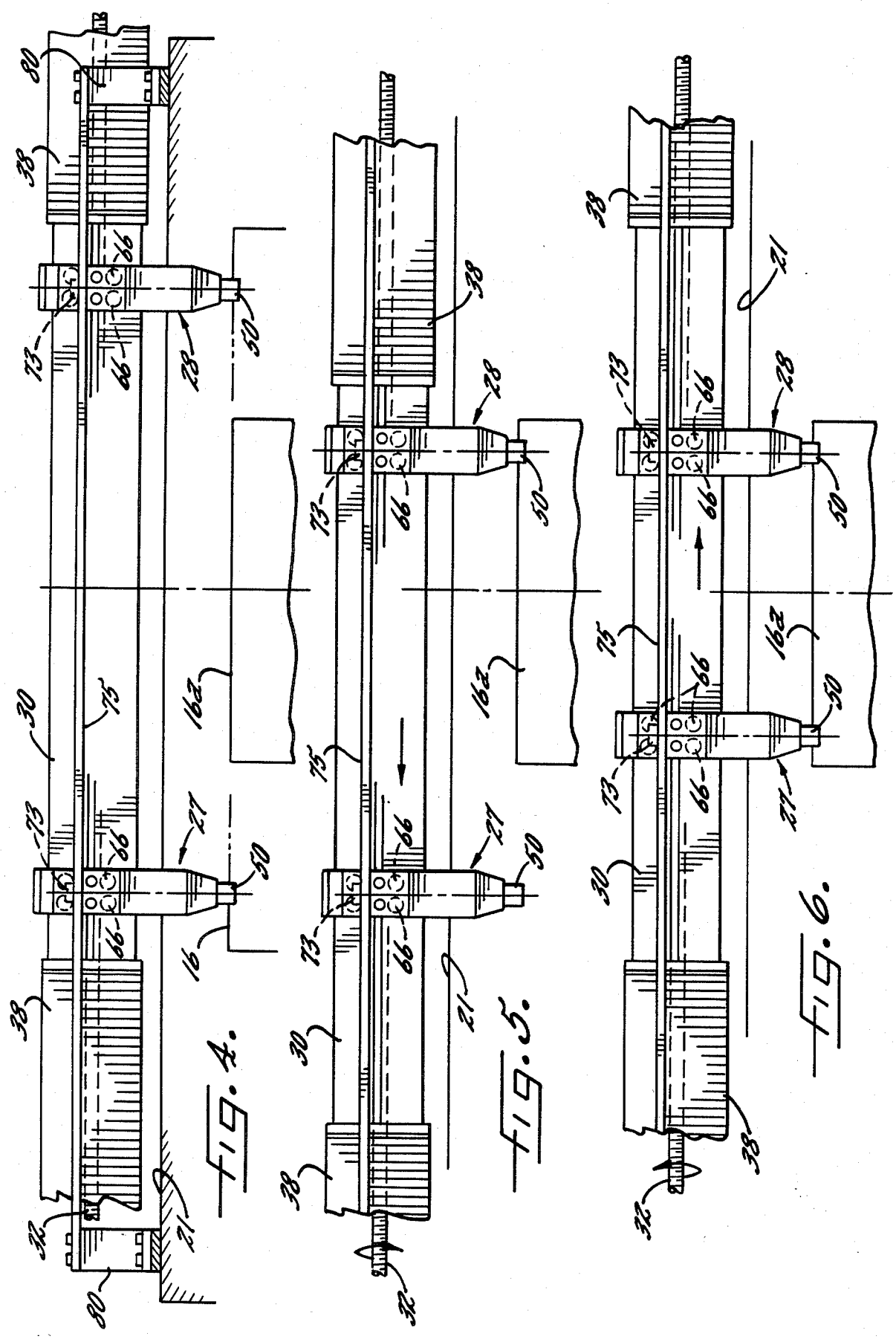

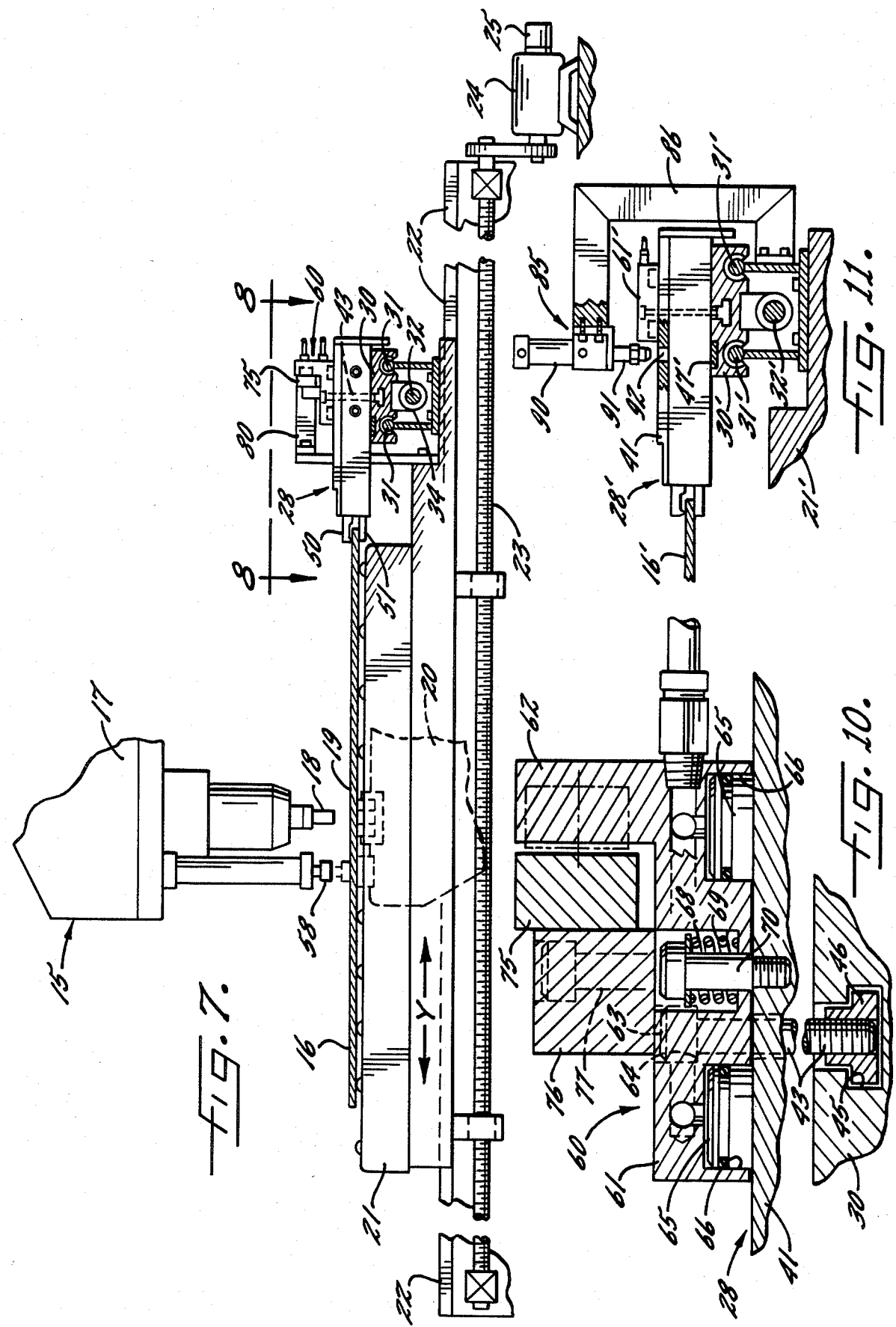

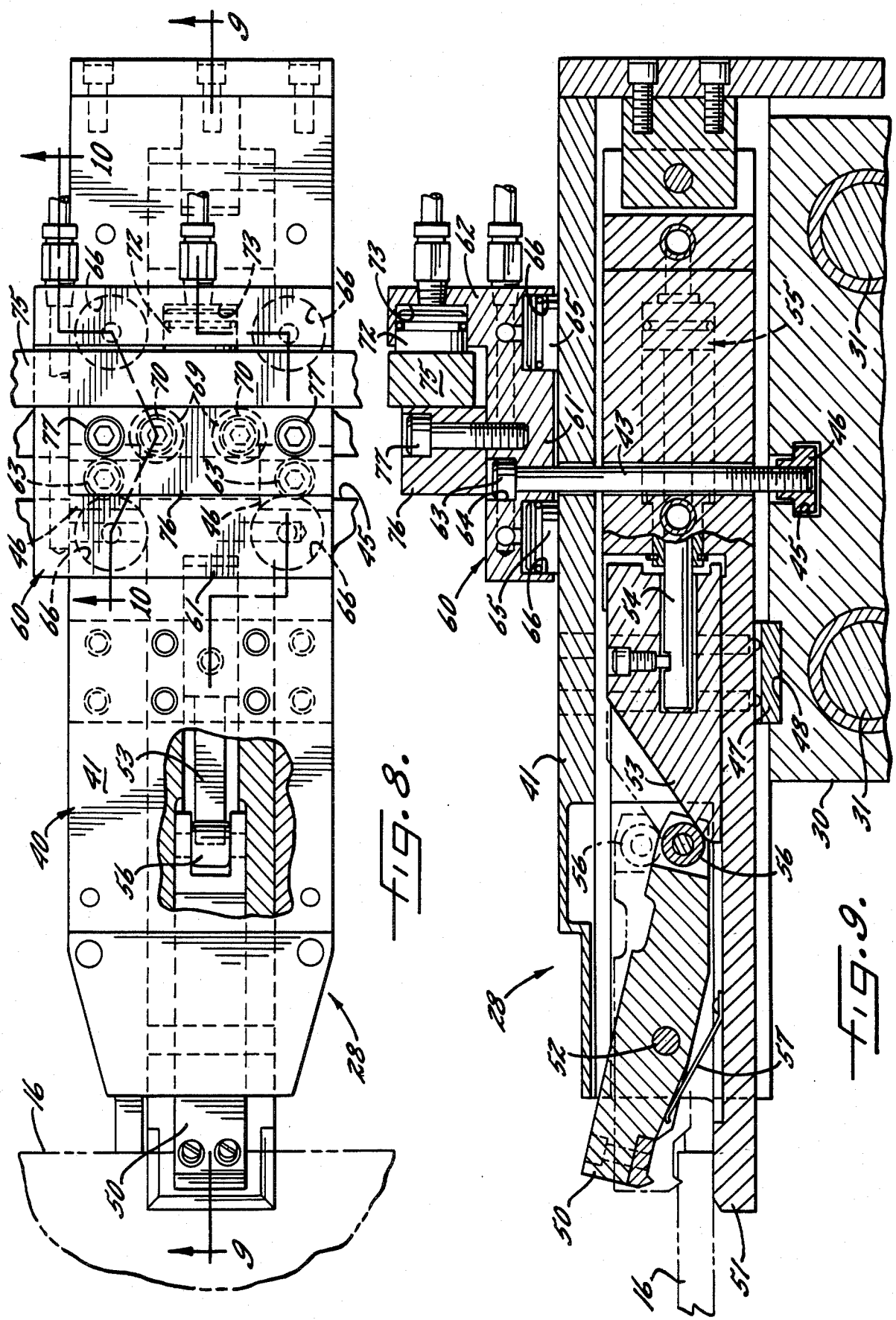

HOLE FORMING MACHINE WITH ADJUSTABLE WORK CLAMPS

BACKGROUND OF THE INVENTION

This invention relates to a machine of the type having a tool for forming holes in a substantially flat and horizontal work sheet. The tool may, for example, be a punch, a plasma-arc torch or a laser. A machine having both a punch and a plasma-arc torch for forming holes in a work sheet is disclosed in Brolund et al U.S. Pat. No. 4,106,183.

In the machine disclosed in that patent, the work sheet is supported on a table which is adapted to be moved in a fore-and-aft direction on a base in order to shift the work sheet to various fore-and-aft positions beneath the tool. Located at the rear of the table are at least two laterally spaced clamps for gripping the rear edge portion of the work sheet. The clamps are supported by a carriage which is adapted to be moved laterally on the table. When the carriage is moved laterally, the clamps shift the work sheet laterally across the table in order to move the work sheet to various lateral positions beneath the tool.

In a somewhat different type of machine, fore-and-aft positioning of the tool and the work sheet is effected by bodily shifting the tool while holding the work sheet in a stationary position. Lateral re-positioning of the work sheet, however, is effected by a carriage having clamps which operate in the manner described above.

The clamps usually are spaced laterally from one another by a distance determined by the width of the work sheet. When the machine is changed over to handle a work sheet of a different width, the clamps must be adjusted on the carriage to increase or decrease the lateral spacing between the clamps. Also, it frequently is necessary to adjust the clamps laterally on the carriage in order to prevent the clamps from interfering with the formation of holes in certain areas of the work sheet.

Heretofore, lateral adjustment of the clamps on the carriage has been effected by manually releasing each clamp from the carriage, by manually shifting the clamp along the carriage to the desired new position and then by manually re-locking the clamp to the carriage. Such manual adjustment requires the machine operator to go back and forth between the front of the machine where the controls are located and the rear of the machine where the clamps are located. In large machines having sheet loading and unloading equipment, the operator must walk a considerable distance between the controls and the clamps. The travel time, as well as the time required to actually adjust the clamps, results in a significant amount of down time for the machine. In addition, the time spent by the operator in adjusting the clamps is not, of course, available for the performance of other duties.

SUMMARY OF THE INVENTION

The general aim of the present invention is to provide new and improved machines of the foregoing type in which the work clamps may be automatically adjusted along the carriage, the automatic adjustment being effected with relatively simple and economical apparatus and without need of complex and comparatively expensive apparatus for physically moving the work clamps themselves during the adjustment.

A more detailed object of the invention is to provide apparatus by which the work clamps may be automatically locked to and released from the carriage and, when released from the carriage, may be automatically held in a stationary position so that the carriage may be moved relative to the clamps to enable the clamps to be re-positioned along the carriage without providing apparatus for adjustably moving the clamps themselves.

Another object is to provide clamps which not only carry means for automatically locking the clamps to and unlocking the clamps from the carriage but which also carry means for automatically locking the clamps in stationary positions regardless of the lateral position of the carriage or the clamps.

Still another object is to provide relatively simple and inexpensive apparatus separate from the clamps themselves for automatically holding either clamp in a stationary position when the clamp is released from the carriage.

These and other objects and advantages of the invention will become more apparent from the following detailed description when taken in conjunction with the accompanying drawings.

BRIEF DESCRIPTION OF THE DRAWINGS

FIG. 1 is a fragmentary top plan view of the table, carriage and clamps of one embodiment of a new and improved machine incorporating the unique features of the present invention.

FIGS. 2 and 3 are partial views similar to FIG. 1 and, when taken with FIG. 1, show successive steps which are followed when one of the clamps is adjusted along the carriage in order to avoid interference between the clamp and a certain area of the work sheet.

FIGS. 4, 5 and 6 also are partial views similar to FIG. 1 but show successive steps which are followed when the clamps are adjusted to grip a work sheet of lesser width than the work sheet previously gripped by the clamps.

FIG. 7 is a fragmentary cross-section taken substantially along the line 7—7 of FIG. 1.

FIG. 8 is an enlarged top plan view of one of the clamps as taken along the line 8—8 of FIG. 7, certain parts of the clamp being broken away and shown in section.

FIG. 9 is a fragmentary cross-section taken substantially along the line 9—9 of FIG. 8.

FIG. 10 is an enlarged fragmentary cross-section taken substantially along the line 10—10 of FIG. 8.

FIG. 11 is a fragmentary side elevational view, partly in section, of a modified embodiment of the invention.

DETAILED DESCRIPTION OF THE PREFERRED EMBODIMENTS

The present invention is illustrated in the drawings in conjunction with a punch press 15 for forming holes in a workpiece 16 which herein is shown as being a flat and horizontal piece of sheet metal. The press includes a conventional C-shaped frame (a portion of which is indicated by the reference numeral 17) housing a hydraulic actuator (not shown) which is adapted to reciprocate a tool such as a punch 18. A die 19 (FIG. 7) underlies the workpiece and is disposed in vertical alignment with the punch to coact with the latter and form a hole in the workpiece when the punch is shifted downwardly. The die is supported on a fixed base 20 which is disposed below the workpiece.

To move the workpiece 16 to various positions beneath the punch 18, the workpiece is supported on a table 21 (FIG. 1) which, in turn, is mounted to move back and forth along a Y-axis by ways 22 on the base 20. A ball screw 23 (FIG. 7) is operably connected to the table and is adapted to move the table when rotated by a reversible servo motor 24 under the control of a numerical control unit (not shown). A position and velocity feedback device 25 is associated with the motor and signals the actual position of the table along the Y-axis to the numerical control unit.

The workpiece 16 also is adapted to be moved laterally along an X-axis which extends perpendicular to the Y-axis. For this purpose, two laterally spaced clamps 27 and 28 are located at the rear of the table 21, are adapted to grip the rear edge portion of the workpiece adjacent the corners thereof and are adapted to be moved laterally in order to re-position the workpiece relative to the punch 18 along the X-axis. The clamps are mounted on a carriage 30 which is guided by a pair of rods 31 (FIGS. 7 and 9) fixed to and extending laterally along the rear of the table 21. A ball screw 32 (FIGS. 1 and 7) for moving the carriage is rotatably supported by bearings 33 (FIG. 1) on the table and is connected to a ball nut 34 (FIG. 7) on the underside of the carriage. Rotation of the screw is effected by a reversible servo motor 35 (FIG. 1) carried by the table 21 and connected to one end of the screw by an endless belt 36, the motor being under the control of the numerical control unit. A position and velocity feedback device 37 is associated with the motor 35 to signal the lateral position of the carriage to the numerical control unit.

Expandible way covers 38 are connected between the table 21 and the ends of the carriage 30 in order to shield the guide rods 31 and the ball screw 32. As the carriage is shifted, the way covers expand and collapse in a manner well known in the art.

Each of the clamps 27 and 28 comprises a box-like housing 40 (FIG. 8) having a top wall 41. The housing is secured to the carriage by a pair of laterally spaced threaded rods or bolts 43 whose lower ends are located in an elongated slot 45 of inverted T-shaped cross-section formed in and extending along the upper side of the carriage 30. An inverted T-shaped bar 46 is threaded onto the lower ends of the bolts and is disposed in the slot. The bar normally holds the respective clamp in a fixed position on the carriage 30 but may be loosened to permit the clamp to be adjusted laterally along the carriage. Fore-and-aft shifting of the clamp on the carriage is prevented by a key 47 on the bottom of the housing 40 of each clamp and fitting into an upwardly opening keyway 48 formed in and extending along the upper side of the carriage. The key 47 also prevents the clamp from turning about a vertical axis.

As shown in FIG. 9, each clamp 27, 28 includes upper and lower jaws 50 and 51 which coact with one another to grip the rear edge portion of the workpiece 16. The upper jaw 50 is supported by a horizontal pivot pin 52 and is adapted to swing about the pin between open and closed positions. To open and close the upper jaw, a wedge 53 is movably supported within the housing 40 and is carried on the end of the rod 54 of a reciprocating hydraulic actuator 55 disposed within the housing. When the rod 54 is advanced by the actuator 55, the wedge 53 acts against a roller 56 on the upper jaw and swings that jaw downwardly to its closed position shown in phantom lines in FIG. 9. When the wedge is retracted by rod 54, the upper jaw is swung upwardly to its open position by a leaf spring 57 acting against the underside of the upper jaw.

When the jaws 50 and 51 of the clamps 27 and 28 are open, the carriage 30 may be advanced laterally along the table 21 and relative to the workpiece 16 to locate the clamps in a desired position along the rear edge portion of the workpiece. After the jaws have been closed, the carriage 30 may be shifted to re-position the workpiece relative to the punch 18 along the X-axis while the table 21 may be shifted to re-position the workpiece along the Y-axis. When the jaws of the clamps are open, the workpiece is held in a fixed position on the table by a pair of vertically reciprocable re-positioning clamps 58 (FIGS. 1 and 7) mounted on the frame 17 and located on opposite sides of the punch 18.

It is frequently desirable for the clamps 27 and 28 to be centered along the length of the carriage 30 as shown in FIG. 1. Also, to best accommodate the weight and bulk of the workpiece 16, it is desirable for the clamps to be located along the carriage so as to grip the workpiece near the corners thereof whenever possible.

Under certain circumstances, it is necessary to adjust one or both of the clamps 27 and 28 laterally along the carriage 30. For example, lateral adjustment of the clamps on the carriage is necessary when the machine 15 is changed over to run a workpiece of a greater or lesser width than the previously-run workpiece. Under such circumstances, the lateral spacing between the clamps must be increased or decreased in order to enable the clamps to grip the corner areas of the next workpiece. In addition, lateral adjustment of one of the clamps relative to the other clamp may be desirable to enable a hole to be punched in the area occupied by the one clamp.

Heretofore, lateral adjustment of the clamps 27 and 28 has been effected by manually loosening the bolts 43 (FIG. 9) to release the bars 46 from the T-slot 45, by manually shifting each clamp to the desired new position on the carriage 30, and then by manually tightening the bolts 43 to re-lock the clamp to the carriage. Such manual adjustment of the clamps is time-consuming and detrimentally affects the production rate of the machine 15 as well as imposing a burden on the operator of the machine.

In accordance with the present invention, lateral adjustment of the clamps 27 and 28 relative to the carriage 30 is effected automatically and without need of providing expensive apparatus for physically adjusting the clamps themselves. In carrying out the invention, automatic lateral adjustment of each clamp relative to the carriage is achieved by automatically releasing the clamp from the carriage, by automatically holding the released clamp in a stationary position along the X-axis, by automatically shifting the carriage along the X-axis relative to the stationary clamp to re-position the carriage with respect to the clamp, and then by automatically re-locking the clamp to the carriage to hold the clamp in its new position on the carriage. As a result, automatic lateral adjustment of the clamps on the carriage is effected to increase the efficiency of both the machine and the machine operator and yet, at the same time, the adjustment is achieved by advantageously utilizing the already-existing motion capability of the carriage 30 along the X-axis so as to avoid the expense and complexity of additional apparatus for physically moving the clamps along the X-axis.

More specifically, each clamp 27, 28 is adapted to be automatically locked to and released from the carriage 30 by automatically raising and lowering the bolts 43 (FIG. 9) so as to shift the T-bar 46 into and out of clamping engagement with the T-slot 45 in the carriage. As shown in FIG. 9, each bolt 43 extends slidably through holes in the housing 40 of the clamp. In addition, the T-bar 46 fits into the T-slot 45 with vertical clearance.

Resting on the top wall 41 of the housing 40 is a generally L-shaped member 60 (FIGS. 9 and 10) having a lower horizontal leg 61 and an upwardly extending leg 62. The heads 63 of the bolts 43 are received in counterbores 64 formed in the horizontal leg 61 of the member 60. When the member 60 is forced upwardly relative to the top wall 41, the bottoms of the counterbores 64 act against the heads 63 of the bolts 43 and pull the bolts upwardly so as to clamp the T-bar 46 tightly against the upper side of the T-slot 45 and thereby lock the clamp 27 or 28 to the carriage 30. When the member 60 is allowed to shift downwardly relative to the top wall 41, the upward force on the bolts 43 and the T-bar 46 is removed so that the T-bar releases the upper side of the T-slot 45 to permit relative lateral movement between the clamp and the carriage.

Upward movement of the L-shaped member 60 in order to clamp the T-bar 46 is effected by four actuators in the form of pistons 65 (FIGS. 9 and 10). Each piston rests on the upper wall 41 of the housing 40 and is telescoped slidably into a downwardly opening cylinder 66 formed in the horizontal leg 61 of the L-shaped member 60. When pressure fluid (e.g., hydraulic oil) is admitted into the cylinders, the pistons react against the top wall 41 and cause the pressure fluid to lift the L-shaped member 60 away from the top wall. Accordingly, the bottoms of the counterbores 64 in the L-shaped member 60 are forced upwardly against the heads 63 of the bolts 43 and the T-bar 46 upwardly and thereby clamp the T-bar to the T-slot 45 to lock the clamp against lateral movement relative to the carriage 30.

When the pressure fluid is dumped from the cylinders 66, the upward force is removed from the L-shaped member 60, the bolts 43 and the T-bar 46. The latter thus releases the T-slot 45 to permit relative movement between the clamp 27, 28 and the carriage 30. To insure that the T-bar 46 fully releases the T-slot 45, coil springs 68 (one of which is visible in FIG. 10) act against the L-shaped member 60 to force the latter downwardly when the pressure fluid is dumped from the cylinders 66. Each spring 68 is located in a counterbore 69 in the horizontal leg 61 of the L-shaped member 60 and is compressed between the bottom of the counterbore and the head of a bolt 70. Each bolt 70 is threaded into the top wall 41 of the housing 40 and extends slidably through the horizontal leg 61 of the L-shaped member 60. The springs urge the L-shaped member downwardly to remove the upward force from the bolts 43 and the T-bar 46 when the cylinders 66 are de-pressurized. Thus, the clamping force between the T-bar and the T-slot is released to permit free relative movement between the clamp and the carriage.

When released from the carriage 30, each clamp 27 and 28 of the machine 15 shown in FIGS. 1 to 10 is adapted to be held in a stationary position along the X-axis by actuator means which are carried by the clamp itself. Herein, such actuator means comprise a piston 72 (FIG. 9) which is telescoped slidably into a forwardly opening cylinder 73 formed in the vertical leg 62 of the L-shaped member 60. When pressure fluid is admitted into the cylinder 73, the piston 72 is forced forwardly into engagement with an elongated member or rail 75 and clamps the rail against a block 76 which is secured to the horizontal leg 61 of the L-shaped member 60 by screws 77. The rail extends lengthwise along the carriage 30 above the upper side thereof and its ends are fastened to brackets 80 (FIGS. 1, 4 and 7) on the table 21.

Thus, the piston 72 is adapted to clamp the rail 75 between itself and the block 76 so as to hold the clamp 27 or 28 in a stationary position on the table 21. When pressure fluid is dumped from the cylinder 73, the piston 76 unclamps the rail 75 to permit the clamp 27, 28 to move relative to the rail.

With the foregoing arrangement, the clamps 27 and 28 move laterally in unison with the carriage 30 whenever the carriage is moved and the cylinders 66 are pressurized to cause the T-bars 46 to lock the clamps to the carriage. When the cylinders 66 are de-pressurized and the cylinder 73 is pressurized, each clamp 27 or 28 is released from the carriage and is held in a stationary position by virtue of being locked to the rail 75. The carriage then may be shifted to a desired position relative to the stationary clamp and, once that position has been reached, the clamp may be automatically unlocked from the rail by de-pressurizing the cylinder 73 and automatically re-locked to the carriage by pressurizing the cylinders 66.

To explain more specifically the steps which can be followed during a particular adjustment operation, let it be assumed that the clamps 27 and 28 are gripping the workpiece 16 adjacent the corners thereof and are spaced equidistantly from opposite sides of the punch 18 as shown in FIG. 1. Let it be further assumed that the cylinders 66 and the cylinder 73 of each clamp are pressurized and de-pressurized, respectively, so that the clamps are locked to the carriage 30 and are unlocked from the rail 75. Finally, let it be assumed that it is necessary to punch a row of holes starting at the left rear corner portion of the workpiece and extending to the right into the area normally occupied by the clamp 27. In order to clear the aforementioned area, it is necessary to shift the clamp 27 to the right. If such shifting is effected simply by moving the carriage 30 and both clamps 27 and 28 in unison to the right, the right clamp 28 would leave the workpiece as soon as the carriage had moved through a short distance and thus the right clamp would not be effective to hold the workpiece.

With the present invention, however, the left clamp 27 may be automatically adjusted to the right relative to the workpiece 16 while still keeping the right clammp 28 in gripping engagement with the workpiece. This is achieved by first opening the jaws 50 and 51 of each clamp with respect to the workpiece. The cylinder 73 of the left clamp 27 then is pressurized in order to lock that clamp to the rail 75. Next, the cylinders 66 of the clamp 27 are de-pressurized to release the clamp from the carriage 30. The carriage then is shifted to the left relative to the stationary left clamp 27 as shown in FIG. 2, the right clamp 28 moving to the left in unison with the carriage. Once the carriage has been shifted to the left through the necessary distance relative to the left clamp 27, the cylinders 66 and the cylinder 73 of that clamp are pressurized and de-pressurized, respectively, to lock the clamp to the carriage and to release the clamp from the rail 75. Thereafter, the carriage is shifted to the right as shown in FIG. 3 and, as an incident thereto, the clamp 27 also is shifted to the right and out of the workpiece area which is to be punched. By comparing FIGS. 1 and 3, it will be seen that the carriage 30 and the right clamp 28 occupy the same position relative to the workpiece 16 in both views but that the left clamp 27 has been re-positioned to the right in FIG. 3.

FIGS. 4 to 6 illustrate one manner in which the clamps 27 and 28 can be adjusted when the machine 15 has finished running the workpiece 16 shown in phantom lines in FIG. 4 and is changed over to run a workpiece 16a of lesser width as shown in solid lines in FIGS. 4 to 6. After the wide workpiece 16 has been removed from the machine 15, the cylinder 73 of the left clamp 27 is pressurized and the cylinders 66 of that clamp are then de-pressurized so as to lock the left clamp to the rail 75 and to release the left clamp from the carriage 30. The carriage and the right clamp 28 then are advanced in unison to the left through a sufficient distance to position the right clamp to grip the right rear corner of the workpiece 16a as shown in FIG. 5. During such movement, the carriage shifts relative to the left clamp 27, the latter remaining locked to the rail 75.

After the right clamp 28 has reached the position shown in FIG. 5, the cylinder 73 and the cylinders 66 of that clamp are pressurized and de-pressurized, respectively, in order to lock the right clamp to the rail 75 and to release the right clamp from the carriage 30. In addition, the cylinder 73 of the left clamp 27 is de-pressurized and the cylinders 66 of the left clamp are pressurized so as to release the left clamp from the rail 75 and to lock the left clamp to the carriage 30. The carriage and the left clamp 27 then are advanced in unison to the right and relative to the stationary right clamp 28 through a sufficient distance to bring the left clamp into position to grip the left corner of the workpiece 16a. When the carriage stops with the left clamp 27 in the position shown in FIG. 6, the cylinders 66 of the right clamp 28 are pressurized and the cylinder 73 of the right clamp is de-pressurized to re-lock the right clamp to the carriage and release the right clamp from the rail. In their final position shown in FIG. 6, the clamps are located to grip the rear corners of the workpiece 16a and are spaced equidistantly from opposite sides of the punch 18.

From the foregoing, it will be apparent that the present invention brings to the art new and improved apparatus for automatically adjusting the clamps 27 and 28 relative to the carriage 30 so as to relieve the machine operator of the need of manually performing that task and to reduce the down time of the machine 15. There is no need of providing apparatus for physically moving the clamps along the X-axis during the adjustment since the adjustment of the clamps is effected by moving the carriage, there being provided selectively operable power operated means, herein shown as cylinders 73, cooperating with means fixed along the X-axis, herein shown as the rail 75, so that the carriage is movable along the X-axis without moving the clamps. Movement of the carriage may be controlled by way of the numerical control unit, the latter also being used to effect pressurization and de-pressurization of the cylinders 66 and 73.

Another embodiment of the invention is shown in FIG. 11 in which parts corresponding to parts of the first embodiment are indicated by the same but primed reference numerals. The embodiment shown in FIG. 11 is characterized in that the clamps 27' and 28' themselves do not carry means for holding the clamps in a stationary position but instead the clamps are adapted to be so held by means 85 on the table 21'.

Herein, the means 85 comprise a generally C-shaped mounting frame 86 which is secured rigidly to the table 21' and which moves back and forth with the table along the Y-axis. The frame, however, does not move along the X-axis with the carriage 30' and this provides a means fixed along the X-axis relative to which the carriage is movable along the X-axis.

Mounted on and cooperating with the upper arm of the frame 86 is a selectively operable power operated means shown as a hydraulic actuator 90 having a vertically reciprocable rod 91 which constitutes a holding member. When advanced downwardly, the rod 91 is adapted to enter into a hole 92 formed in the upper wall 41' of each of the clamps 27' and 28'.

With the foregoing arrangement, adjustment of the clamps 27' and 28' is effected by shifting the carriage 30' laterally until the hole 92 of one of the clamps is aligned with the actuator 90. The actuator then is pressurized to cause the rod 91 to advance downwardly into the hole 92 and hold the alined clamp in a stationary position. Thereafter, the cylinders 66' may be de-pressurized to release the clamp from the carriage and thereby permit the carriage to be re-positioned relative to the clamp. After such re-positioning has been effected, the cylinders 66' are pressurized to re-lock the clamp to the carriage and then the rod 91 is retracted to release the clamp. If necessary, the other clamp then may be adjusted by moving the carriage to position the hole 92 of that clamp into alignment with the actuator 90 and by following the steps described above.

Advantageously, the hole 92 in the upper wall 41' of each clamp 27' and 28' is aligned vertically with the key 47'. As a result, the rod 91 of the actuator 90 does not impose any substantial turning moment on the key 47' when the clamp is unlocked from the carriage 30' and the carriage is shifted laterally relative to the clamp. The rod 91 is constructed such that it does not exert any vertical force on the clamp and thus does not lock the clamp to the carriage.

The second embodiment shown in FIG. 11 is somewhat simpler and less expensive than the embodiment shown in FIGS. 1 to 10 in that the second embodiment does not require the piston 72 and the cylinder 73 and thus does not require as many hydraulic lines extending to the clamps. On the other hand, the embodiment of FIG. 11 requires that each clamp be shifted to a predetermined position adjacent the frame 86 and the actuator 90 before the adjustment may be effected. Thus, the overall adjustment procedure requires somewhat longer time than is the case with the first embodiment where the clamps may be held in a stationary position at any location along the rear of the table.

It should be appreciated that the principles of the invention are applicable to machines other than the machine specifically shown herein. For example, the carriage may be used in conjunction with a machine in which re-positioning of the punch and the workpiece along the Y-axis is effected by physically moving the punch while holding the workpiece stationary rather than by moving the workpiece by means of a table. Such a machine is disclosed in Scott et al U.S. Pat. No. 4,423,546. In a machine of that type, the carriage is supported to move along the X-axis by the base rather than by a table.

We claim:

1. A machine having a tool for forming holes in a substantially flat and horizontal work sheet, said machine comprising a base, a carriage selectively movable back and forth relative to said base along an X-axis, first and second laterally spaced clamps normally movable with said carriage and adapted to selectively grip and release one edge portion of the work sheet, said clamps re-positioning said work sheet along said X-axis relative to said tool when said clamps grip said work sheet and move laterally with said carriage, the improvement in said machine comprising, first and second power-operated actuators movable with said first and second clamps, respectively, each actuator being selectively operable to lock the respective clamp to said carriage for lateral movement therewith or to release such clamp from the carriage to permit the carriage to move relative to such clamp, means fixed along the X-axis so that the carriage is movable relative to said fixed means, and selectively operable power-operated means cooperating with said fixed means for holding each clamp in a stationary position along the X-axis when such clamp is released from the carriage whereby the carriage may be moved relative to such clamp in a stationary position to permit such clamp to be re-positioned along the carriage.

2. A machine as defined in claim 1 in which said means fixed along the X-axis is an elongated member extending along said X-axis, said carriage being movable along said X-axis relative to said member, said selectively operable means comprising third and fourth power-operated actuators movable with said first and second clamps, respectively, each of the latter actuators being selectively operable to lock the respective clamp to said member so as to hold such clamp in a stationary position along the X-axis or to release such clamp from said member so as to permit such clamp to move with said carriage and relative to said member.

3. A machine as defined in claim 1 in which said selectively operable means comprises a third power-operated actuator disposed in a fixed position along said X-axis, said carriage being movable relative to said third actuator along said X-axis, said third actuator being selectively operable to hold either of said clamps in a stationary position along said X-axis during lateral movement of said carriage or to release either of said clamps so as to permit the clamps to move with said carriage.

4. A machine as defined in claim 3 further including key means between each clamp and said carriage and preventing such clamp from shifting relative to the carriage along a Y-axis perpendicular to said X-axis, said key means also preventing each clamp from turning relative to the carriage about a vertical axis while permitting such clamp to shift relative to the carriage along said X-axis, and said third actuator having a holding member which is positioned to engage each clamp at a location spaced above and alined vertically with said key means.

5. A machine as defined in claim 4 in which each clamp is formed with a hole spaced above and aligned vertically with the key means of such clamp, said holding member being vertically movable and being adapted to enter the hole of either clamp when shifted downwardly.

6. A machine as defined in claim 1 in which said carriage includes an elongated slot which extends along said X-axis, an elongated rod extending vertically through each clamp and supported for up and down movement relative to such clamp, clamping means on a lower end portion of each rod and disposed within said slot, said clamping means locking said clamp to said carriage when said rod is shifted vertically in one direction and releasing said clamp from said carriage when said rod is shifted vertically in the opposite direction, and said first and second actuators being operable to shift said rods vertically.

7. A machine having a tool for forming holes in a substantially flat and horizontal work sheet, said machine comprising a base, a carriage selectively movable back and forth relative to said base along an X-axis, first and second laterally spaced clamps normally movable with said carriage and adapted to selectively grip and release one edge portion of the work sheet, said clamps re-positioning said work sheet along said X-axis relative to said tool when said clamps grip said work sheet and move laterally with said carriage, the improvement in said machine comprising, an elongated member extending along said X-axis, said carriage being movable along said X-axis relative to said member, first and second power-operated actuators movable with said first and second clamps, respectively, each actuator being selectively operable to lock the respective clamp to said carriage for lateral movement therewith or to release the clamp from the carriage to permit the carriage to move relative to the clamp, and third and fourth power-operated actuators movable with said first and second clamps, respectively, each of the latter actuators being selectively operable to lock the respective clamp to said member and thereby hold said clamp in a stationary position along said X-axis when said clamp is released from the carriage whereby the carriage may be moved relative to such clamp in a stationary position to permit such clamp to be re-positioned along the carriage.

8. A machine having a tool for forming holes in a substantially flat and horizontal work sheet, said machine comprising a base, a carriage selectively movable back and forth relative to said base along an X-axis, first and second laterally spaced clamps normally movable with said carriage and adapted to selectively grip and release one edge portion of the work sheet, said clamps re-positioning said work sheet along said X-axis relative to said tool when said clamps grip said work sheet and move laterally with said carriage, the improvement in said machine comprising, first and second power-operated actuators movable with said first and second clamps, respectively, each actuator being selectively operable to lock the respective clamp to said carriage for lateral movement therewith or to release such clamp from the carriage to permit the carriage to move relative to such clamp, and a third power-operated actuator disposed in a fixed position along said X-axis, said carriage being movable relative to said third actuator along said X-axis, said third actuator being selectively operable to hold either clamp in a stationary position along said X-axis when such clamp is released from the carriage whereby the carriage may be moved relative to such clamp in a stationary position to permit such clamp to be re-positioned along the carriage.

* * * * *